(12) United States Patent
Beeler

(10) Patent No.: US 6,363,650 B1
(45) Date of Patent: Apr. 2, 2002

(54) FISHING ROD HOLDER AND JIGGING ASSEMBLY

(76) Inventor: Clinton R. Beeler, 6625 E. 55th St., Tulsa, OK (US) 74145

( * ) Notice: Subject to any disclaimer, the term of this patent is extended or adjusted under 35 U.S.C. 154(b) by 0 days.

(21) Appl. No.: 09/519,303

(22) Filed: Mar. 6, 2000

Related U.S. Application Data

(60) Provisional application No. 60/128,205, filed on Apr. 7, 1999.

(51) Int. Cl.[7] .............................................. A01K 87/00
(52) U.S. Cl. ...................................................... 43/19.2
(58) Field of Search .......................................... 43/19.2

(56) References Cited

U.S. PATENT DOCUMENTS

| | | | |
|---|---|---|---|
| 2,187,849 A | | 1/1940 | Buddenbrock |
| 2,783,576 A | * | 3/1957 | Filut ............................ 43/19.2 |
| 3,550,302 A | * | 12/1970 | Creviston et al. ............. 43/19.2 |
| 3,789,534 A | * | 2/1974 | Yankaitis ...................... 43/19.2 |
| 3,797,157 A | | 3/1974 | Semich |
| 3,839,810 A | * | 10/1974 | Lagasse ......................... 43/19.2 |
| 4,349,978 A | | 9/1982 | Philip |
| 4,420,900 A | | 12/1983 | Nestor |
| 4,680,885 A | * | 7/1987 | Lindell et al. ................ 43/19.2 |
| 4,821,448 A | | 4/1989 | Lindaberry |
| 4,951,411 A | * | 8/1990 | Ecker ........................... 43/19.2 |
| 5,036,616 A | | 8/1991 | Wilsey |
| 5,084,995 A | * | 2/1992 | Beaudoin ..................... 43/26.1 |
| 5,473,835 A | * | 12/1995 | Emett ........................... 43/19.2 |
| 5,535,538 A | * | 7/1996 | Heuke .......................... 43/19.2 |

* cited by examiner

*Primary Examiner*—Kurt Rowan
(74) *Attorney, Agent, or Firm*—Jeffrey L. Thompson; Thompson & Thompson, P.A.

(57) ABSTRACT

An improved fishing rod holder and jigging apparatus has a cradle portion for engaging and loosely supporting a fishing rod, and a jigging device attached to the cradle portion for jigging a fishing line. The cradle portion provides a stationary support on which a fishing rod can be placed and removed easily during fishing. A support arm having a handgrip portion is connected to the cradle portion for supporting the jigging device. The jigging device includes a motor and a drive wheel driven by the motor. A fishing line striker is pivotally attached to the drive wheel about a pivot axis that is generally parallel to a rotation axis of the drive wheel and a longitudinal axis of the fishing rod. The fishing line striker and drive wheel are arranged such that the fishing line striker flops from a laid-back position into sudden engagement with the fishing line as a center of mass of the fishing line striker passes over its pivot axis during rotation of the drive wheel. A guide member is secured to the base structure adjacent to the drive wheel for guiding the fishing line into a path of the fishing line striker.

7 Claims, 2 Drawing Sheets

FISHING ROD HOLDER AND JIGGING ASSEMBLY

RELATED APPLICATIONS

This application claims the benefit of U.S. Provisional Patent Application Ser. No. 60/128,205 filed on Apr. 7, 1999, which is incorporated herein by reference.

BACKGROUND OF THE INVENTION

1. Field of the Invention

The present invention relates generally to equipment for catching fish and, in particular, to an apparatus for supporting a fishing rod and causing the bait or lure at the end of the fishing line to be activated in the water to attract fish.

2. Description of the Related Art

Numerous products have been developed over the years to improve people's ability to catch fish. Included in these products are fishing line "jiggers" or "jigging" devices that cause the bait or lure on the fishing line to move in the water. Examples of prior patent disclosures relating to devices for jigging fishing lines include U.S. Pat. No. 5,036,616 issued to Wilsey, U.S. Pat. No. 4,821,448 issued to Lindaberry, U.S. Pat. No. 4,420,900 issued to Nestor, U.S. Pat. No. 4,349,978 issued to Philip, and U.S. Pat. No. 2,187,849 issued to Buddenbrock. Each of these patent disclosures generally acknowledges that fish are more readily attracted to moving bait than to stationary bait. However, the movement or jigging action created by these jigging devices fails to provide the type of movement that attracts the most fish under certain fishing conditions. Moreover, these jigging devices are attached directly to the fishing rod or reel and tend to interfere with the normal use of the fishing rod and reel during casting and reeling when jigging action is not desired.

There also exists in the prior art a fishing rod holder for supporting a fishing rod on a side of a boat, a dock, or the like. This prior art fishing rod holder includes a clamping assembly for attaching the holder to a boat or the like, and a cradle portion on which the fishing rod is placed. The cradle portion is adjustable relative to the clamping assembly to change the angle at which the fishing rod is supported. This prior art fishing rod holder does not include a jigging device.

Thus, there is a need in the fishing equipment industry for an improved jigging device to attract fish to a fisherman's bait or lure that does not interfere with the normal use of the fishing rod.

SUMMARY OF THE INVENTION

It is an object of the present invention to provide an improved jigging device for a fishing rod that activates bait or lure at the end of a fishing line in a manner that attracts more fish.

It is a further object of the present invention to provide an improved jigging device that will not interfere with casting or reeling in the fishing line.

It is a further object of the present invention to provide a fishing rod holder equipped with a jigging device that provides a support for a conventional fishing rod and a jigging action for the fishing line without attaching directly to the fishing rod.

It is a further object of the present invention to provide an improved jigging device that is economical and easy to manufacture, efficient in use, capable of a long operating life, and particularly well suited for a variety of fishing conditions.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

The present invention provides an improved fishing rod holder and jigging apparatus that has a cradle portion for engaging and loosely supporting a fishing rod, and a jigging device attached to the cradle portion for jigging a fishing line. The cradle portion provides a stationary support on which the fishing rod can be placed and removed easily during fishing. A support arm having a handgrip portion is connected to the cradle portion for supporting the jigging device. The jigging device includes a motor and a drive wheel driven by the motor. A fishing line striker is pivotally attached to the drive wheel about a pivot axis that is generally parallel to a rotation axis of the drive wheel and a longitudinal axis of the fishing rod. The fishing line striker and drive wheel are arranged such that the fishing line striker flops from a laid-back position into sudden engagement with the fishing line as a center of mass of the fishing line striker passes over its pivot axis during rotation of the drive wheel. A guide member is secured to the base structure adjacent to the drive wheel for guiding the fishing line into a path of the fishing line striker.

According to a first broad aspect of the present invention, a jigging apparatus for fishing is provided, comprising: a base structure; a rotatable drive member supported by the base structure; and a fishing line striker pivotally attached to the drive member about a pivot axis, the fishing line striker and the drive member being arranged such that the fishing line striker rotates into sudden engagement with a fishing line to cause a jigging movement in the fishing line as a center of mass of the fishing line striker passes over the pivot axis during rotation of the drive member.

According to another broad aspect of the present invention, a fishing rod holder and jigging apparatus are provided, comprising: a cradle portion for engaging and loosely supporting a fishing rod; and a jigging device attached to the cradle portion, the jigging device comprising a means for jigging a fishing line.

According to another broad aspect of the present invention, a jigging apparatus for fishing is provided, comprising: a base structure; a motor secured to the base structure, the motor having a rotatably driven output shaft; a drive member operably connected to the output shaft so as to be rotatably driven by the motor; and a fishing line striker pivotally attached to the drive member about a pivot axis, the fishing line striker and the drive member being arranged such that the fishing line striker flops from a laid-back position into sudden engagement with a fishing line to cause a jigging movement in the fishing line as a center of mass of the fishing line striker passes over the pivot axis during rotation of the drive member.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE PREFERRED EMBODIMENT

A preferred embodiment of the fishing rod holder and jigging assembly according to the present invention will now be described in detail with reference to FIGS. 1 to 4 of the accompanying drawings.

Figure 1:
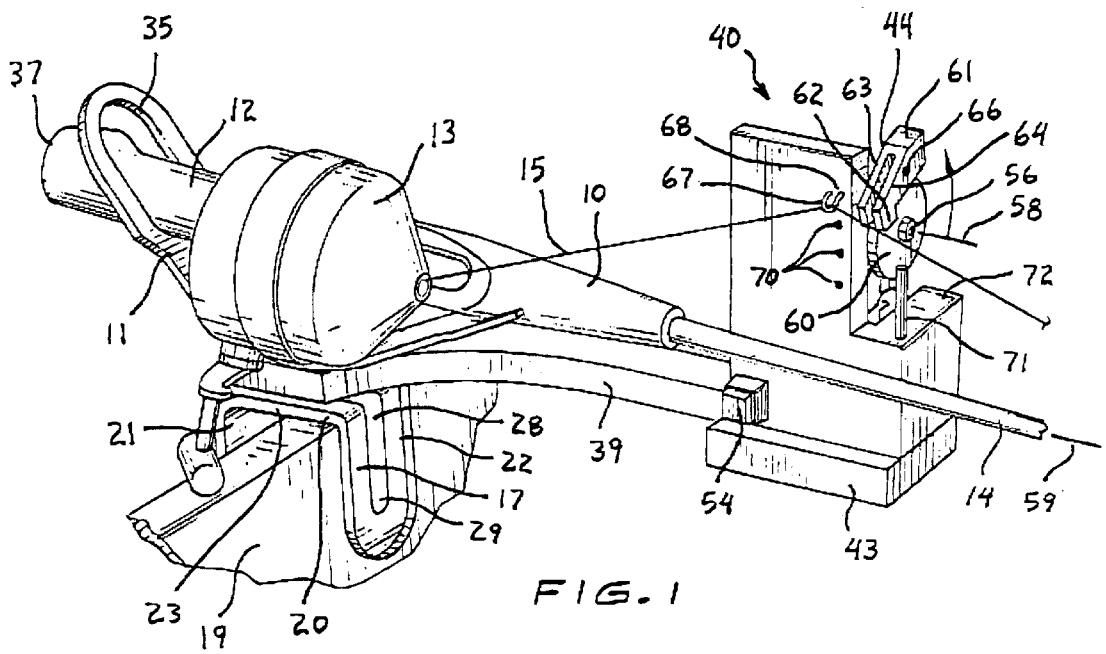
FIG. 1 is a perspective front view of a fishing rod holder and jigging assembly with a fishing rod placed thereon according to the present invention.
Figure 2:
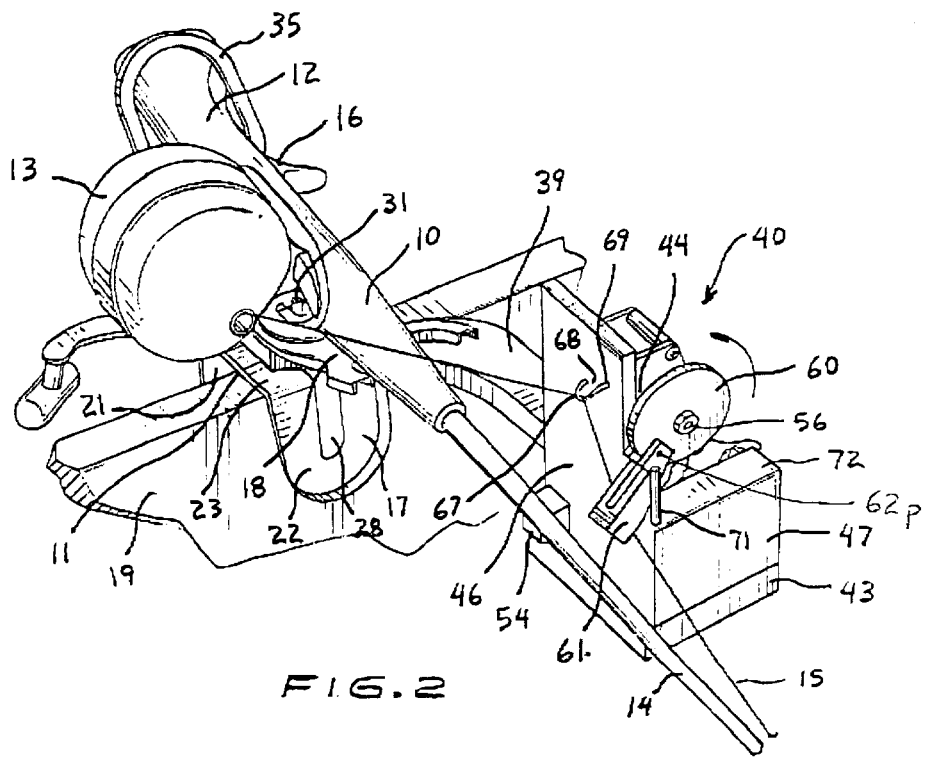
FIG. 2 is a perspective front view of the fishing rod holder and jigging assembly of the present invention with the fishing line striker on the main drive wheel shown in an over-center position.
Figure 3:
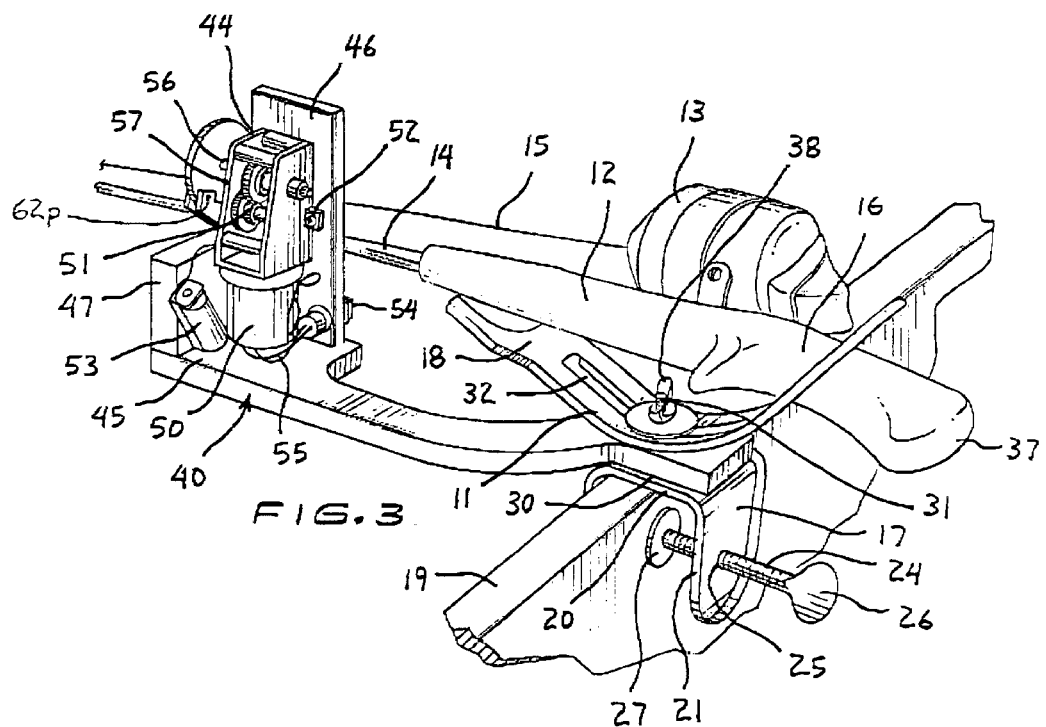
FIG. 3 is a perspective rear view of the fishing rod holder and jigging assembly of the present invention.

As shown in FIGS. 1 to 3, a conventional fishing rod 10 is supported by the fishing rod holder 11 of the present invention. The fishing rod 10 includes a handle portion 12, a reel 13 attached to the handle portion 12, and a pole or shaft 14 extending from the handle portion 12. The reel 13 houses a supply of fishing line 15 that can be fed outwardly and threaded through eyelets (not shown) positioned along a length of the pole 14. The portion of the fishing line 15 extending from the reel 13 and passing through the eyelets is generally parallel to a longitudinal axis of the fishing rod 10. The fishing rod 10 shown in the drawings has an enclosed reel 13 and a handgrip portion 16 formed into the handle portion 12. However, it will be appreciated that the present invention is not limited to any particular type of fishing rod or reel and that a variety of other fishing rod and reel arrangements could be used with the fishing rod holder 11.

The fishing rod holder 11 includes a clamp assembly 17 and a cradle portion 18 attached to the clamp assembly 17. The clamp assembly 17 is adapted to secure the fishing rod holder 11 to a rigid structure 19, such as a side wall of a boat, a dock, or the like. The clamp assembly 17 has a generally U-shaped member 20 with first and second legs 21, 22 extending from a body portion 23. A first threaded member 24 is received in a first threaded opening 25 on the first leg 21 for engaging the rigid structure 19. The first threaded member 24 has an enlarged grip portion 26 at one end that can be gripped and turned by a user to tighten and loosen the clamp assembly 17. An enlarged foot 27 is provided at the other end of the first threaded member 24 to press against the rigid structure 19 when the clamp assembly 17 is tightened.

A second opening 28 is provided in at least one of the second leg 22 and the body portion 23 of the U-shaped member 20, and preferably is in the form of a slot that extends from a midpoint 29 of the second leg 22 to a midpoint 30 of the body portion 23. A second threaded member 31 extends through the second opening 28 and a corresponding opening 32 in the cradle portion 18 for securing the cradle portion 18 and the clamp assembly 17 together. By providing the second opening 28 in the form of a slot extending from the second leg 22 to the body portion 23, the clamp assembly 17 can be adjusted easily to adapt to various rigid structures 19 on which the holder 11 is to be clamped. For example, when the second threaded member 31 extends through a portion of the second opening 28 on the body portion 23 as shown in FIGS. 1 to 4, the U-shaped member 20 opens downwardly and can be clamped over the top of a vertical wall 19. On the other hand, when the second threaded member 31 extends through a portion of the slotted second opening 28 on the second leg 22, the U-shaped member 20 opens in a horizontal direction and can be clamped to a horizontal wall or other suitable structure.

The cradle portion 18 comprises an arcuate member 33 having front and rear supports 34, 35 disposed at opposite ends. The front support 34 has a U-shaped configuration that opens upwardly to receive a fishing rod 10. The rear support 35 has an oval-shaped opening 36 through which a rear end 37 of the handle portion 12 of the fishing rod 10 can be inserted. When the fishing rod 10 is placed in the holder 11, the rear support 35 prevents the fishing rod 10 from inadvertently falling out of the holder 11, e.g., when a fish tugs on the line 15.

A slotted opening 32 is provided in the arcuate member 33 between the front and rear supports 34, 35. The second threaded member 31 extends through the slotted opening 32 and has a wing nut 38 or other suitable structure that can be tightened to secure the cradle portion 18 to the clamp assembly 17. The slotted opening 32 in the arcuate member 33 allows the cradle portion 18 to be adjusted relative to the clamp assembly 17 to change the angle at which the fishing rod 10 is supported by the holder 11. The cradle portion 18 provides a stationary support on which a fishing rod 10 can be placed and removed easily during fishing.

A support arm 39 of the jigging apparatus 40 has a first end 41 sandwiched between the cradle portion 18 and the clamp assembly 17. The first end 41 of the support arm 39 has an opening through which the second threaded member 31 extends. When the wing nut 38 or other suitable structure is tightened on the second threaded member 31, the support arm 39 is fixed securely to the fishing rod holder 11. The support arm 39 has a handgrip portion 42 formed along its length to facilitate carrying the jigging apparatus 40.

Figure 4:
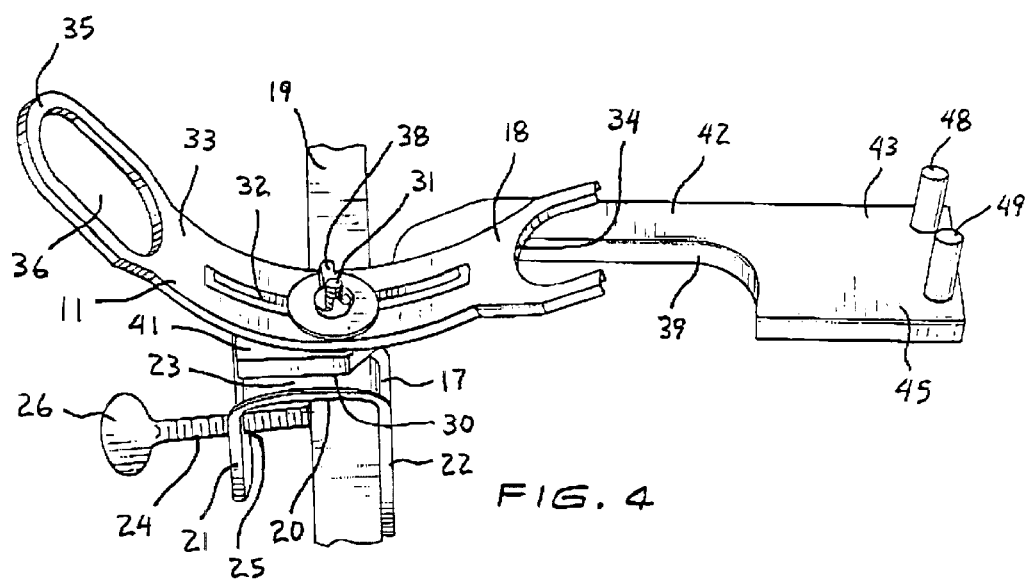
FIG. 4 is a perspective side view of the fishing rod holder and support for the jigging assembly with the jigging device and fishing pole removed.

A second end 43 of the support arm 39 supports a jigging mechanism 44 of the present invention. The jigging mechanism 44 has a base structure 45 with first and second upstanding walls 46, 47 secured to the support arm 39. As shown in FIG. 4, a pair of dowels 48, 49 may be fixed to the second end 43 of the support arm 39 for positioning and securing the jigging mechanism 44 to the support arm 39.

A drive motor 50 and gear reduction mechanism 51 are mounted on the first wall 46 of the base structure 45 using threaded screws 52 or the like. A battery 53 for powering the drive motor 50 is mounted to the second wall 47 of the base structure 45. A push-button switch 54 is mounted to the first wall 46. The battery 53 and switch 54 are connected to the drive motor 50 by electrical wires 55 that conduct electrical current to the drive motor 50. The drive motor 50 is selectively energized by current from the battery 53 when the switch 54 is in an ON position, and de-energized when the switch 54 is in an OFF position.

The gear reduction mechanism 51 has an output shaft 56 protruding from a front side 57 thereof which is rotated about an axis 58 generally parallel to the longitudinal axis 59 of the fishing rod 10. The output shaft 56 is positioned above and to one side of the fishing rod 10. A main drive wheel 60 is secured to the output shaft 56 for rotation with the output shaft 56. A fishing line striker 61 is pivotally mounted to the drive wheel 60 about a pivot axis 62 near an outer periphery of the drive wheel 60. The pivot axis 62 on which the fishing line striker 61 is mounted is generally parallel to the rotation axis 58 of the output shaft 56 and the longitudinal axis 59 of the fishing rod 10. The fishing line striker 61 revolves with the drive wheel 60 as the output shaft 56 is rotated by the drive motor 50.

The fishing line striker 61 has first and second legs 63, 64 that straddle the drive wheel 60. The pivot axis 62 of the fishing line striker 61 is defined by a connecting pin 62*p* that passes through respective openings in the first and second legs 63, 64 and the drive wheel 60 and allows free pivotal movement of the fishing line striker 61 relative to the drive wheel 60. The pivot axis 62 of the fishing line striker 61 is generally parallel to and offset from the axis of rotation 58 of the drive wheel 60. The drive wheel 60 and fishing line striker 61 are arranged such that the fishing line striker 61 rotates or "flops" into sudden engagement with the fishing line 15 to cause a jigging movement in the fishing line 15 as a center of mass 66 of the fishing line striker 61 passes over the pivot axis 62 (i.e., the line striker 61 passes through a vertical plane containing the pivot axis 62) during rotation of the output shaft 56. As the drive wheel 60 continues to rotate, the fishing line striker 61 is dragged across and out of engagement with the fishing line 15. The fishing line striker 61 thus causes a further jigging movement in the fishing line 15 when the line is disengaged from the fishing line striker 61 and returns to its original position.

A guide member 67 is secured to the first wall 46 of the base structure 45 adjacent to the drive wheel 60. The guide member 67 has the shape of a hook with an open side 68 facing upwardly once the guide member 67 is secured to the base structure 45. The guide member 67 includes a threaded portion 69 that can be screwed into the first wall 46 at selected locations. The guide member 67 is arranged to guide the fishing line 15 into a path of the fishing line striker 61 to ensure that the fishing line 15 is engaged by the fishing line striker 61 during operation of the jigging apparatus 40. By changing the position of the guide member 67 on the base structure 45, the jigging movement of the fishing line 15 can be changed or adjusted to suit a particular fishing condition. A plurality of holes 70 for receiving the guide member 67 can be preformed in the first wall 46 of the base structure 45 to facilitate changing the position of the guide member 67.

A second guide member 71 extends from an upper surface 72 of the second wall 47 of the base structure 45. The second guide member 71 is positioned such that the drive wheel 60 and fishing line striker 61 are disposed generally between the second guide member 71 and the first wall 46 of the base structure 45. The second guide member 71 keeps the fishing line 15 in place as the fishing line striker 61 is slid over the line 15, and thereby prevents the fishing line 15 from becoming entangled in the drive wheel 60 during operation. The space between the second guide member 71 and the first wall 46 allows the fishing line striker 61 to fall freely when it flops over-center into engagement with the fishing line 15.

In operation, the fishing line striker 61 rotates with the drive wheel 60 when the motor 50 is energized. The fishing line striker 61 is kept in a folded-back position, as shown in FIGS. 1 and 3, during a majority of each rotation of the drive wheel 60. However, when the center of mass 66 of the fishing line striker 61 passes over the pivot axis 62 of the fishing line striker 61 (approximately just after the rotation position shown in FIG. 1), the fishing line striker 61 will flop over-center and engage the fishing line 15 with a sudden impact. Because the fishing line 15 is held by the first guide member 67, and the fishing line striker 61 engages the fishing line 15 with a sudden impact, a sudden movement is imparted to the line 15 by the fishing line striker 61. This sudden movement causes the bait or lure on the end of the fishing line 15 to be activated in a twitching manner that will readily attract fish. Further rotation of the drive wheel 60 causes the fishing line striker 61 to slide over the fishing line 15 until the end of the fishing line striker 61 clears the fishing line 15 and the line is allowed to return to its position before it was engaged by the fishing line striker 61. This causes another sudden movement in the fishing line 15 that causes the lure or bait on the end of the fishing line to twitch again.

Those skilled in the art will appreciate that the shape and size of the drive wheel 60 and fishing line striker 61 can be changed to obtain different operating characteristics. For example, a star-shaped drive wheel could be used having a plurality of fishing line strikers that flop into engagement with the fishing line upon each rotation of the drive wheel. The fishing line striker is preferably formed of a heavy material, such as metal, to cause sufficient deflection of the fishing line when the fishing line striker engages the fishing line.

The position and arrangement of the drive motor 50, gear-reduction mechanism 51, battery 53 and switch 54 can be changed without departing from the present invention. For example, the switch 54 could be mounted to the second wall 47 of the base structure 45 or near the first end 41 of the support arm 39. The battery 53 could be mounted to the gear-reduction mechanism 51, the first wall 46 of the base structure 45, or the support arm 39. A motor having a built-in gear reduction or a slow drive speed could be used without a separate gear reduction mechanism. Also, the first guide member 67 could be attached to the first wall 46 of the base structure 45 using other suitable fastening means, such as Velcro™ fasteners, pins, or the like. A plurality of first guide members 67 positioned at predetermined locations could be used to adjust the position of the fishing line 15 without the need for removing and refastening the first guide member to change the fishing line position.

In an alternative embodiment, a windup mechanism could be used in place of the electric motor 50 to rotate the drive wheel 60 in the manner contemplated by the present invention. By way of example, where only one fishing line striker 61 is used, a drive wheel rotation speed of approximately 5 to 20 rpms would be suitable for most fishing conditions.

It will be appreciated that the present invention is not limited to the exact constructions that have been described above and illustrated in the accompanying drawings, and that various modifications and changes can be made without departing from the scope and spirit of the invention. It is intended that the scope of the invention be limited only by the appended claims.

What is claimed is:

1. A jigging apparatus for fishing, comprising:
   a base structure;
   a rotatable drive member supported by said base structure, said drive member having an axis of rotation; and
   a fishing line striker pivotally attached to said drive member about a pivot axis which is offset from said axis of rotation of the drive member, said fishing line striker and said drive member being arranged such that said fishing line striker rotates into sudden engagement with a fishing line to cause a jigging movement in the fishing line as a center of mass of said fishing line striker passes through a vertical plane containing said pivot axis of said fishing line striker during rotation of said drive member about said axis of rotation;
   wherein said drive member is a drive wheel; and
   wherein said fishing line striker comprises first and second legs that straddle said drive wheel, said pivot axis of said fishing line striker is defined by a connecting pin that passes through respective openings in said first and second legs and said drive wheel and allows free pivotal movement of said fishing line striker relative to said drive wheel, and said pivot axis of said fishing line striker is generally parallel to and offset from said axis of rotation of said drive wheel.

2. The jigging apparatus according to claim 1, wherein said base structure is attached to a fishing rod holder adapted to loosely support a fishing rod.

3. The jigging apparatus according to claim 1, further comprising a guide member secured to said base structure adjacent to said drive member, said guide member being arranged to guide the fishing line into a path of said fishing line striker, whereby jigging movement in the fishing line upon engagement by said fishing line striker is enhanced by said guide member.

4. The jigging apparatus according to claim 3, wherein a position at which said guide member is secured to said base structure is adjustable to change the jigging movement of the fishing line upon engagement by said fishing line striker.

5. The jigging apparatus according to claim 1, wherein said drive member is operably connected to said output shaft via a gear reduction mechanism.

6. The jigging apparatus according to claim 1, further comprising a user-operated switch mounted on said base structure for selectively starting and stopping said motor to control said jigging movement.

7. The jigging apparatus according to claim 1, further comprising a guide means located adjacent to said drive member for guiding the fishing line into a path of said fishing line striker, said guide means being adjustable to change the jigging movement of the fishing line caused by said fishing line striker.

* * * * *